Dec. 19, 1944.  B. F. LANGER  2,365,565
POWER MEASURING SYSTEM FOR ROTATING SHAFTS
Filed Nov. 19, 1942
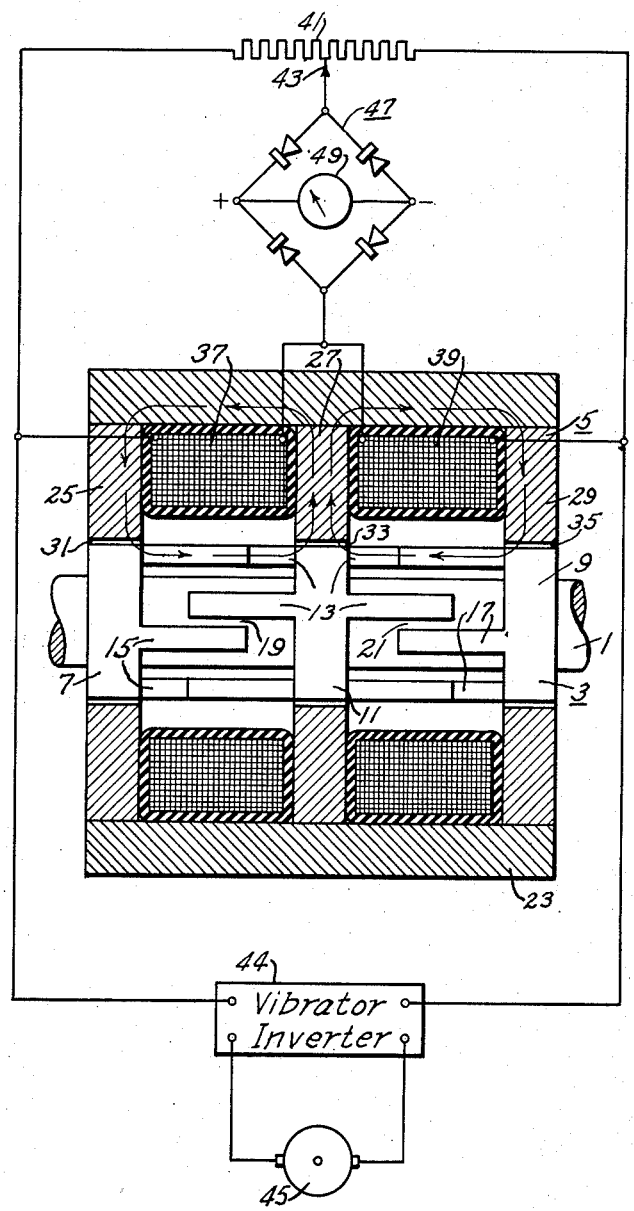
WITNESSES:
INVENTOR
Bernard F. Langer.
BY
Paul E. Friedemann
ATTORNEY Patented Dec. 19, 1944

2,365,565

UNITED STATES PATENT OFFICE 2,365,565

POWER MEASURING SYSTEM FOR ROTATING SHAFTS

Bernard F. Langer, Pittsburgh, Pa., assignor to Westinghouse Electric & Manufacturing Company, East Pittsburgh, Pa., a corporation of Pennsylvania Application November 19, 1942, Serial No. 466,148

5 Claims. (Cl. 73—136)

The present invention relates generally to systems for continuously indicating or measuring mechanical power.

More particularly, the present invention relates to a system of the character mentioned which employs a magnetic type of strain gauge for providing the torque sense which is utilized in conjunction with a speed sense to produce a continuous indication of the power output of a shaft.

The present invention is closely related to applicant's copending applications, Serial No. 466,145, filed November 19, 1942, entitled Strain measuring system, Serial No. 466,147, filed November 19, 1942, entitled Strain measuring system, and a copending application of B. F. Langer and T. E. Browne, Jr., Serial No. 466,149, filed November 19, 1942, entitled Strain measuring system. Portions of the descriptive material appearing in applicant's copending application Serial No. 466,147 have been included in the present specification for the purpose of completeness.

A principal object of the present invention is to provide a power measuring system for a rotating shaft which shall function simply and efficiently and have a minimum number of parts.

Another object of the present invention is to provide a power measuring system of the character mentioned which shall continuously and accurately indicate the power being transmitted by the given shaft.

A specific object of the present invention is to provide a power measuring system wherein a voltage proportional to the speed of rotation of the given shaft may be supplied to a magnetic type of strain gauge adapted to alter the value of the applied voltage in an amount proportional to the torque of the given shaft whereby the resultant voltage is proportional to the torque and the speed or horsepower output of the given shaft.

Other objects and advantages will become more apparent from a study of the following specification when considered in conjunction with the accompanying drawing in which the single figure illustrates a horsepower measuring system embodying the principles of the present invention.

Broadly stated, the horsepower measuring system herein disclosed combines a means for producing a voltage proportional to the speed of the given shaft which voltage is modified by means responsive to the torque of the shaft to produce a resultant voltage indicative of the horsepower being transmitted by the shaft.

The specific strain gauge or torque measuring device schematically illustrated in the drawing is described in detail in a copending application of B. F. Langer and F. W. Godsey, Jr., Serial No. 458,378, filed September 15, 1942, entitled "Torque measuring devices for shafts" and only such description which is necessary for a complete understanding of the construction and operation of the strain gauge will be included in the present specification.

Referring now to the single figure of the drawing, numeral 1 denotes a shaft, the power output of which is to be measured; numeral 3 denotes a rotor assembly secured to rotate with the shaft and which in effect forms the armature member of the strain gauge, and numeral 5 denotes an annular stationary member which is concentrically positioned about the shaft and which in effect forms the core assembly of the strain gauge.

The rotor assembly 3 comprises a pair of axially spaced torque rings 7 and 9 secured to the shaft over bushings (not shown) of non-magnetic material so that a circulating magnetic flux will not include the shaft if the shaft is made of steel or other magnetic material. Centrally disposed between the rings 7 and 9 is a third ring 11 termed a reference ring likewise supported and secured to the shaft on a bushing (not shown) of non-magnetic material. The three rings thus secured to the shaft are so axially spaced and supported that a known gauge-length of shaft is included therebetween. The reference ring 11 has secured thereto a plurality of axially extending fingers 13 which extend axially on each side of the ring in the same axial plane. Each of the torque rings 7 and 9 have a plurality of axially extending fingers 15 and 17 which are of sufficient length to overlap the extremities of the fingers 13 associated with reference ring 11. The confronting faces of the cooperating fingers of the three shaft rings are so positioned during assembly that a small air gap is included therebetween and the above-described assembly is such that, for example, if torque were to be transmitted from left to right of the shaft, as viewed in the drawing, in a clockwise direction, torsional deflections of the shaft between the torque ring 7 and the reference ring 11 would so displace the fingers 15 relative to the finger 13 cooperating therewith that the air gaps 19 formed therebetween would be increased and the torsional deflections of the shaft between reference ring 11 and torque ring 9 would so displace the fingers 17 relative to the fingers 13 cooperating therewith that the air gaps 21 formed therebetween would be decreased.

The stationary member 5 comprises an outer annular shell 23 having axially spaced and secured therewithin three ring elements 25, 27 and 29, each of which is positioned to be included in a transverse plane defined by one of the shaft ring elements. The inner bores of the ring element are of such diameter that small annular air gaps 31, 33 and 35 are formed between the peripheries of the concentrically positioned confronting faces. Included within the annular recesses formed between the axially spaced rings 25, 27 and 29 are a pair of annular coils 37 and 39 which are each connected as one leg in a conventional bridge circuit which has for each of its other two legs half of the potentiometer 41.

It will now be seen, therefore, that if a constant source of alternating current potential were to be applied across the input terminals of the bridge circuit, a flow of alternating magnetic flux may be caused to flow in the stationary member 5 and the rotor assembly 3 in the instantaneous directions indicated by the arrows and for zero torque of the shaft the bridge circuit may be adjusted to a balanced condition by movement of the potentiometer slider 43 across the potentiometer 41. Upon torsional deflection of the shaft due to clockwise torque from left to right of the shaft as previously described the air gaps 19 will be increased while the air gaps 21 will be decreased to substantially proportionally change the values of the alternating magnetic fluxes associated with each of the coils. The alternating magnetic flux associated with one coil being increased while the alternating magnetic flux associated with the other coil is decreased. Thus the impedances of the coils are changed one increasing while the other decreases, thereby unbalancing the bridge circuit and causing an alternating current voltage proportional to the torque of the shaft to appear across the output terminals of the bridge circuit, and in view of the assumed constant source of alternating current potential applied across the input terminals of the bridge, the voltage output across the output terminal is indicative of the torque being transmitted by the shaft.

If now some variable source of alternating current potential were applied across the input terminals of the bridge circuit it is obvious that the resultant or output voltage of the bridge circuit would at any instant be some value proportional to the applied variable alternating current voltage and the torque of the shaft and would therefore no longer be indicative of the torque being transmitted by the shaft. If the torque were to remain constant and the applied potential varied, the voltage output of the bridge would vary in a proportional amount.

From the foregoing explanation, it may now, therefore, be seen that if some alternating current potential varying in magnitude with the speed of the given shaft were applied across the input terminals of the bridge circuit, a voltage output of the bridge circuit would be obtained proportional to both the torque and the speed of the shaft and would thus be an indication or measure of the horsepower output of the shaft.

To accomplish this end a direct current tachometer generator 45 or other equivalent device is provided. This generator is driven at some speed proportional to the shaft speed and may be directly coupled to the given shaft or located conveniently at any point in a shaft system which may be in continuous mechanical or electrical coupling with the given shaft. The direct current voltage produced by this generator is proportional to the speed of the shaft and as the shaft speed varies so does the generator voltage output vary.

Since the coils 37 and 39 are necessarily energized with an alternating current potential, the direct current potential produced by the generator 45 is converted as schematically illustrated in the drawing by means of a vibrator inverter 44 or other similar device of practically any well known type. Preferably the apparatus utilized to produce the alternating current potential should produce an alternating current potential of substantially constant frequency and should be so adjusted as to produce voltage values proportional to the applied direct current potential over the desired range of voltage values, otherwise voltage errors from the inverter source will be introduced into the system. The alternating current potential thus provided is applied across the input terminals of the bridge circuit.

Assuming now that the shaft is transmitting power, the tachometer generator 45 produces a direct current potential proportional to the speed of rotation of the shaft 1 which potential is converted to an alternating current potential as previously described by the device 44 and this alternating current potential having a value proportional to the shaft speed energizes the bridge circuit including the strain gauge coils 37 and 39. Since the torsional deflections of the shaft due to the applied torque changes the impedances of the coils by the previously described flux linkage, the bridge circuit is unbalanced and an alternating current voltage varying in magnitude with the source of applied potential and the degree of impedance unbalance of the coils appears across the output terminals of the bridge circuit and is conveniently metered by a metering circuit including a bridge rectifier 47 having its input terminals across the output terminals of the bridge circuit and a meter 49, which may be graduated to read horsepower, connected across the positive and negative terminals of the bridge rectifier. The rectified voltage thus supplied to the meter is proportional to both the speed and torque of the shaft and is, therefore, an indication of the horsepower being transmitted by the shaft.

The foregoing disclosure and the showing made in the drawing are merely illustrative of the principles of this invention and are not to be interpreted in a limiting sense. The only limitations are to be determined by the scope of the appended claims.

I claim as my invention:

1. A system for continuously measuring the power output of a rotating shaft comprising, in combination, stationary electrical coil means, means for producing a direct current potential corresponding in value to the speed of rotation of said shaft, an electrical inverter connected to said means for producing a direct current potential whereby said direct current potential is converted to an alternating current potential of a substantially constant frequency for energizing said electrical coil means, means responsive to the torsional deflections of said shaft due to torque, in flux linkage with said electrical coil means, adapted to vary an alternating current voltage in said electrical coil means in an amount proportional to the torque of said shaft; and means for measuring the variations of the alternating current voltage in said coil means whereby the power output of said shaft is indicated.

2. A system for continuously measuring the power output of a rotating shaft comprising, in combination, at least two stationary electrical coils, means for producing an alternating current voltage of substantially constant frequency having a value proportional to the speed of rotation of said shaft, for energizing said electrical coils; means in flux linkage with said electrical coils adapted to increase the impedance of one coil while decreasing the impedance of the other coil in response to torsional deflection of said shaft due to torque to cause an alternating current voltage difference to appear between the coils, and means for measuring the voltage difference whereby the power output of said shaft is indicated.

3. A system for continuously measuring the power output of a rotating shaft comprising, in combination, a normally balanced impedance bridge circuit, at least one stationary electrical coil included as one leg in said bridge circuit, means for producing an alternating current potential of constant frequency having a value which varies in magnitude with the speed of rotation of said shaft when said shaft is rotated, for energizing said bridge circuit; a rotor assembly secured to said shaft and in flux linkage with said coil, said rotor assembly varying the impedance of said coil by changing the flux linkage thereof upon torsional deflection of said shaft, thus unbalancing said bridge circuit; and means for measuring the voltage unbalance of said bridge circuit whereby the power output of said shaft is indicated.

4. A system for continuously measuring the power output of a rotating shaft comprising, in combination, a rotor assembly secured to rotate with said shaft, a stationary member disposed in close proximity to said rotor assembly, electrical coil means associated with said stationary member, means for producing an alternating current potential of a fixed frequency varying in magnitude with the speed of rotation of said shaft for energizing said electrical coil means, whereby an alternating magnetic flux linked with said electrical coil means is induced in said stationary member and said rotor assembly; means included in said rotor assembly for changing the value of the alternating magnetic flux linkage in an amount corresponding to the torque of said shaft, thereby changing the value of an alternating current voltage in said electrical coil means; and means for measuring the voltage change in said electrical coil means whereby the power output of said shaft is indicated.

5. A system for continuously measuring the power output of a rotating shaft comprising, in combination, a rotor assembly secured to rotate with said shaft, a stationary member positioned in close proximity to said rotor assembly, a bridge circuit, two electrical coils supported by said stationary member included as adjacent legs in said bridge circuit, means for producing a direct current potential varying in magnitude with the speed of rotation of said shaft, electro-mechanical means for converting said direct current potential to an alternating current potential of fixed frequency for energizing said bridge circuit, said electrical coils being adapted to induce a flow of alternating magnetic flux in said stationary member and said rotor assembly such that each coil has an alternating magnetic flux linked therewith, said coils having an alternating current voltage therein of a value to maintain said bridge circuit in a balanced condition when said shaft is not subject to torque, means included in said rotor assembly responsive to torsional deflections of said shaft due to torque for changing the values of the alternating magnetic fluxes linked with each of said coils such that an alternating current voltage difference appears between the coils whereby said bridge circuit is unbalanced, and means for measuring the bridge circuit unbalance whereby the power output of said shaft is indicated.

BERNARD F. LANGER.